Sept. 3, 1940.  R. W. PATON  2,213,452
PISTON RING
Filed Nov. 19, 1938
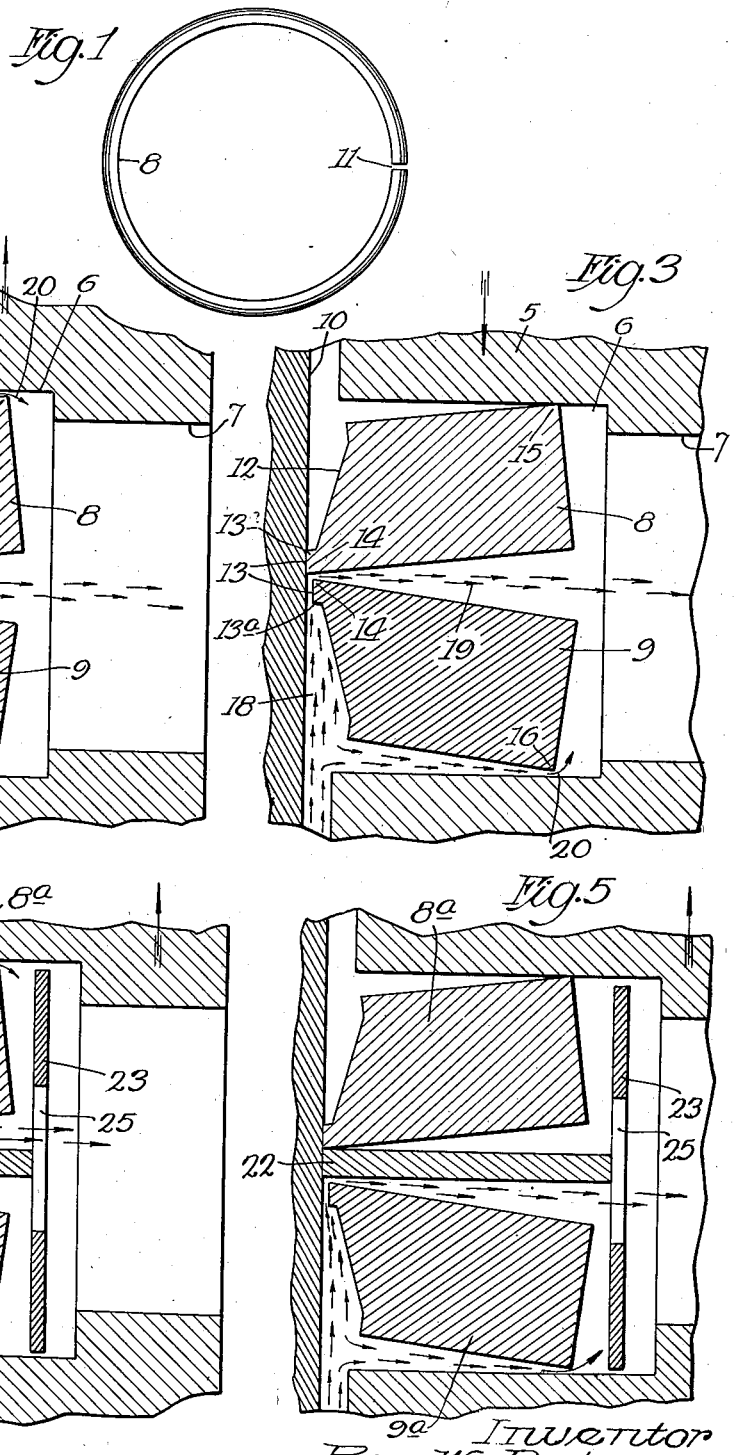
Inventor
Roy W. Paton Patented Sept. 3, 1940

2,213,452

UNITED STATES PATENT OFFICE 2,213,452

PISTON RING

Roy W. Paton, Hagerstown, Ind., assignor to The Perfect Circle Company, Hagerstown, Ind., a corporation of Indiana Application November 19, 1938, Serial No. 241,329

16 Claims. (Cl. 309—45)

My invention relates to piston rings for internal combustion engines and more particularly to oil control or regulating rings for such engines.

It has long been the almost universal commercial practice to employ in internal combustion engines, such as are used in automobiles, rings provided with slots, recesses or grooves extending radially through the ring, for controlling or regulating the oil on the cylinder wall, the excess oil being conducted to the inside of the piston through openings in the back of the ring groove in the piston. There are many forces, factors and conditions entering into the intricate and delicate problem of oil control ring performance. The problem has become progressively more difficult as the speeds and temperatures of the engines have been increased. One of the difficulties which has become extremely troublesome is the formation of carbon in the slots or recesses, and also in the face grooves of the slotted type of oil ring referred to. Excessive wear of the rings also quickly impairs the efficiency of their operation as well as shortens the useful efficient life of the ring. Some of these slotted oil rings are single piece rings while others are two piece rings, being split longitudinally. Still others, which are only intended for use in worn cylinders of used engines, comprise thin steel rings and a spacer between them, the structure being provided with a face groove and oil slots or recesses extending through the rings. I am of the opinion that with the slotted type of oil rings in use, the oil does not pass through the face groove and slots with sufficient velocity, eddies are formed and the oil burns and forms the carbon deposits. It has been found necessary to use spring expanders behind the rings and these expanders, among other objections, add expense. None of these rings have satisfactorily solved the problem which now confronts the industry.

The principal object of my invention is to provide an oil ring which will overcome these difficulties and will at the same time be highly efficient in operation in either a new or an old engine, which will be long lived and which is simple in structure and cheap to manufacture.

To this end, in general, I provide a ring comprising ring sections have outer peripheries so formed that they twist in reverse directions in the piston ring groove and converge toward the cylinder wall, the oil being scraped from the cylinder wall and being conducted between the ring sections by a hydraulic action, while at the same time the ring acts as a check valve to prevent the oil from passing around the ring back to the cylinder wall.

The above and other objects of my invention will become more apparent from the following description taken in conjunction with the accompanying drawing, in which Fig. 1 is a plan view of one of the ring sections;

Fig. 2 is a fragmentary vertical section showing the ring within the piston groove and in the relative positions which the ring sections assume during the upstroke of the piston;

Fig. 3 is a view like Fig. 2 but showing the relative positions of the ring sections on the down stroke of the piston; and Figs. 4 and 5 are views similar to Figs. 2 and 3, respectively, and illustrate a modified form of my invention.

The piston 5 is provided with the usual ring groove 6 having the usual openings 7 at the back of the groove for conducting the excess oil to the interior of the piston. Referring to Figs. 1, 2 and 3, my improved ring comprises the two ring sections 8 and 9 which are adapted to engage the cylinder wall which is indicated at 10. By "ring section," I mean a one piece annular member which is split at one point, as at 11 in Fig. 1, and has inherent "tension."

The ring sections 8 and 9 are preferably the same, each being of uniform cross section throughout and each having the main portion of its face, i. e. the outer periphery, reduced or removed, for the purposes to be presently explained. As shown in the drawing, the major portion of the face of each section is chamfered at 12 at an angle of approximately 25° with respect to the plane at right angles to the sides of the section, this plane with respect to the upper section 8 being indicated in Fig. 2 by the dotted line 12ª. The remainder of the face forms a circumferential rib or land 13ª with its edge 13 slightly beveled. The dotted line 13ᵇ extending from the lower outer corner 15 of the upper section 8 in Fig. 2 indicates a plane parallel to the plane 12ª and the edge 13 is beveled at approximately 2½° to 3° with respect to the plane 13ᵇ.

When the piston with the ring sections mounted in the piston groove is placed in the cylinder, the contraction of the ring sections to the diameter of the cylinder causes the ring sections, by reason of their chamfered faces, to have a torsional twist so that the adjacent outer corners 14 of the ring sections are in contact, the upper inner corner 15 of the upper ring section engages the upper side of the ring groove, the inner lower corner 16 of the lower ring section engages the lower side of the ring groove, and the edges 13 of the ribs 13ª engage the cylinder wall substantially flush. However, this torsional twist does not cause the corners 15 and 16 to press so tightly against the sides of the ring groove as to impair the inherent tension and prevent the free "breathing" of the ring sections in the ring groove.

During the upstroke of the piston in operation of the engine, the upper ring section 8, due to its chamfered face, slides over the oil 18 on the cylinder wall and is forced slightly inwardly, its corner 14 sliding on the upper side of the lower ring section 9. Hydraulic pressure thus is created at the corner 14 of the ring section 8 with the result that the excess oil is squirted or shot between the rings with considerable force or velocity, as indicated diagrammatically at 19. At the same time some of the oil is forced into the wedge shaped opening between the upper side of the groove and the upper side of the upper ring section 8 and is feathered over the upper inner edge 15 of section 8 as indicated diagrammatically at 20. During the upstroke of the piston, the lower ring section remains in contact with the cylinder wall and its lower inner corner, due to the torsional twist of the section and the action of the section 8, firmly engages the lower side of the piston groove and thus prevents oil which has been removed from the cylinder wall from passing outwardly under the section 9.

On the downstroke of the piston the reverse action or operation of the ring sections takes place, as illustrated in Fig. 3. That is to say, the lower ring section 9 slides over the oil on the cylinder wall, the upper section 8 engages the cylinder wall, and the engagement of the upper inner corner 15 of the section 8 prevents the oil from passing from behind the ring over the section 8. The manner in which the ring sections operate may be properly called a check valve action, in that they cooperate so that the upper ring section seals at the cylinder wall and piston groove on one stroke and the lower ring section seal performs the same functions on the opposite stroke. It will also be observed that the ribs 13ª, being narrow, afford high unit pressure of the ring sections against the cylinder wall, which enhances the oil economy and efficiency of the ring structure as well as increase its life.

Referring now to the modified form of my invention, illustrated in Figs. 4 and 5, the ring comprises three ring sections 8ª, 9ª and 22. The ring sections 8ª and 9ª, which are preferably formed of cast iron, are, as shown, obviously similar in cross section and operation to the sections 8 and 9 described above. Interposed between the sections 8ª and 9ª is the thin flat ring section 22, which is formed of metal such as steel, which is more wear-resistant and has greater tension than the usual cast iron. The outer periphery of the ring section 22 is flat and engages flush with the cylinder wall. If desired a spring expander 23, of any suitable form, may be employed to augment the outward pressure of the section 22 against the cylinder wall, though the expander should not act on the ring sections 8ª and 9ª. The expander 23 is provided with suitable openings 25 for the passage of the oil therethrough.

It is clear from Fig. 4, which illustrates the operation of the ring sections during the upstroke of the piston, and Fig. 5 which illustrates the operation on the downstroke of the piston, that the action of the ring structure shown is similar in principle to that of the ring structure illustrated in Figs. 2 and 3 and described above. During the upstroke of the piston the ring section 8ª slides over the oil film and the excess oil, due to the hydraulic pressure at the lower outer corner of the section 8ª, is forced at high velocity between the section 8 and the section 22, while at the same time the lower inner corner of the section 9ª seals against the passage of the oil outwardly under its lower side. On the downstroke of the piston the action is just the reverse.

It will be appreciated, of course, that I have illustrated, for better understanding of the invention, the action of the ring structures in a somewhat exaggerated fashion in the drawing.

It will be apparent that my invention is admirably adapted to accomplish the objects primarily stated. In fact, actual use of my invention has demonstrated that the ring structure practically overcomes the difficulties heretofore encountered in oil control rings. The carbon trouble has been eliminated. The oil film is accurately controlled or calibrated with attendant economy and efficiency. The ring may be used with equal facility and satisfaction in either a new or an old engine. The structure is easily made at low cost.

I claim:

1. In an oil ring for internal combustion engines comprising a plurality of superimposed ring sections, the upper and lower ring sections each being of uniform cross section throughout and the outer face of the upper ring section above its cylinder contacting portion being removed or reduced and the outer face of the lower ring section below its cylinder contacting portion being removed or reduced, the ring sections being disposed due to said removed or reduced portions in outwardly converging relation with the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower ring section being moved inwardly by the hydraulic pressure of the oil and the excess oil being forced to pass above the lower ring section during the downstroke of the piston.

2. In an oil ring for internal combustion engines comprising a plurality of superimposed ring sections, the upper and lower ring sections each being of uniform cross section throughout and the outer face of the upper ring section above its cylinder contacting portion being chamfered inwardly from said cylinder contacting portion and the outer face of the lower ring section below its cylinder contacting portion being chamfered inwardly from said cylinder contacting portion, the ring sections being disposed due to said chamfered portions in outwardly converging relation with the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower section being moved inwardly by the hydraulic pressure of the oil and the excess oil being forced to pass above the lower section during the downstroke of the piston.

3. An oil ring for internal combustion engines comprising two ring sections each of uniform cross section and the upper ring section having the upper portion of its outer face inset from the lower cylinder contacting portion of said face and the lower ring section having the lower portion of its outer face inset from the upper cylinder contacting portion of said face, and the adjacent outer corners of the two ring sections being in line contact throughout the circumference of the ring and the sections being in outwardly converging relation.

4. An oil control ring for internal combustion engines comprising two oppositely disposed outwardly converging ring sections having adjacent cylinder contacting portions on their outer face and also chamfers on their outer faces with the chamber on the upper ring section above its cylinder contacting portion and the chamfer on the lower ring section below its cylinder contacting portion, the lower outer corner of the upper ring section being in continuous uninterrupted contact with the upper side of the lower section throughout the circumference of the ring, and the upper inner corner of said upper section being adapted to engage the upper side of the piston groove and the upper outer corner of the lower section being in continuous uninterrupted contact with the lower side of the upper section throughout the circumference of the ring and lower inner corner of the lower section being adapted to engage the lower side of the piston groove.

5. An oil control ring for internal combustion engines consisting of two oppositely disposed superimposed outwardly converging ring sections, having adjacent narrow continuous cylindrical portions on their outer faces and oppositely extending side chamfers on their outer faces to cause the sections to torsionally twist when contracted, the adjacent outer corners of the sections being continuous and uninterrupted and each being adapted to slide in continuous contact with the opposite side of the other section and the upper inner corner of the upper section being adapted to contact with the upper side of the piston groove and the lower inner corner of the lower section being adapted to engage the lower side of the piston groove.

6. In an oil ring for internal combustion engines comprising a plurality of superimposed ring sections, the upper and lower ring sections each being of uniform cross section throughout and the outer face of the upper ring section having a cylinder contacting portion with a beveled edge above its said cylinder contacting portion being removed or reduced and the outer face of the lower ring section having a cylinder contacting portion with a beveled edge and below its said cylinder contacting portion being removed or reduced, the ring sections being disposed due to said removed or reduced portions in outwardly converging relation with the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower ring section being moved inwardly by the hydraulic pressure of the oil and the excess oil being forced to pass above the lower ring section during the downstroke of the piston.

7. In an oil ring for internal combustion engines comprising a plurality of superimposed ring sections, the upper and lower ring sections each being of uniform cross section throughout and each having circumferential ribs on its outer face forming a cylinder contacting portion and the outer face of the upper ring section above its cylinder contacting portion being removed or reduced and the outer face of the lower ring section below its cylinder contacting portion being removed or reduced, the ring sections being disposed due to said removed or reduced portions in outwardly converging relation witth the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower ring section being moved inwardly by the hydraulic pressure of the oil and the excess oil being forced to pass above the lower ring section during the downstroke of the piston.

8. In an oil ring for internal combustion engines comprising a plurality of superimposed ring sections, the upper and lower ring sections each being of uniform cross section throughout and each having at its outer face a cylinder contacting portion with the edge slightly beveled and the outer face of the upper ring section above its cylinder contacting portion being chamfered inwardly from said cylinder contacting portion and the outer face of the lower ring section below its cylinder contacting portion being chamfered inwardly from said cylinder contacting portion, the ring section being disposed due to said chamfered portions in outwardly converging relation with the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower section being moved inwardly by the hydraulic pressure of the oil and the excess oil being forced to pass above the lower section during the downstroke of the piston.

9. In an oil ring for internal combustion engines comprising a plurality of superimposed ring sections, the upper and lower ring sections each being of uniform cross section throughout and each having a narrow circumferential rib on its outer face forming a cylinder contacting portion with the edge thereof slightly beveled and the outer face of the upper ring section above its cylinder contacting portion being chamfered inwardly from said cylinder contacting portion and the outer face of the lower ring section below its cylinder contacting portion being chamfered inwardly from said cylinder contacting portion, the ring section being disposed due to said chamfered portions in outwardly converging relation with the upward inner corner of the upper section adapted to engage the upper side of the piston groove and with the lower inner corner of the lower section adapted to engage the lower side of the piston groove, the upper section being moved inwardly by the hydraulic pressure of the oil and excess oil being forced to pass below said upper section during the upstroke of the piston and the lower section being moved inwardly by the hydraulic pressure of the oil and the excess oil being forced to pass above the lower section during the downstroke of the piston.

10. An oil ring for internal combustion engines comprising two ring sections each of uniform cross section and each having a narrow circumferential rib on its outer face forming a cylinder contacting portion with the edge thereof slightly beveled, and the upper ring section having the upper portion of its outer face inset from the lower cylinder contacting portion of said face and the lower ring section having the lower portion of its outer face inset from the upper cylinder contacting portion of said face, and the adjacent outer corners of the two ring sections being in line contact throughout the circumference of the ring and the sections being in outwardly converging relation.

11. An oil control ring for internal combustion engines comprising two oppositely disposed outwardly converging ring sections having adjacent cylinder contacting portions on their outer face with the outer edges slightly beveled to engage flush against the cylinder wall and the ring sections also having chamfers on their outer faces with the chamfer on the upper ring section above its cylinder contacting portion and the chamfer on the lower ring sections below its cylinder contacting portion, the lower outer corner of the upper ring section being in continuous uninterrupted contact with the upper side of the lower section throughout the circumference of the ring, and the upper inner corner of said upper section being adapted to engage the upper side of the piston groove and the upper outer corner of the lower section being in continuous uninterrupted contact with the lower side of the upper section throughout the circumference of the ring and lower inner corner of the lower section being adapted to engage the lower side of the piston groove.

12. An oil control ring for internal combustion engines comprising superimposed intermediate, upper and lower ring sections, the intermediate section being relatively flat and having a cylindrical face adapted to engage flush with the cylinder wall and each of the upper and lower ring sections having cylinder contacting portions and a chamfer on its outer face, the upper and lower ring sections being of uniform cross section throughout the circumference of the ring and the chamfer on the upper section extending inwardly and upwardly from the cylinder contacting portion of said face and the chamfer in the lower section extending downwardly and inwardly from the cylinder contacting portion of the face of said lower ring and the upper and lower section being in outwardly converging relation with each other.

13. An oil control ring for internal combustion engines comprising superimposed intermediate, upper and lower ring sections, the intermediate section being relatively flat and having a cylindrical face adapted to engage flush with the cylinder wall and each of the upper and lower ring sections having cylinder contacting portions with beveled edges and a chamfer on its outer face, the upper and lower ring sections being of uniform cross section throughout the circumference of the ring and the chamfer on the upper section extending inwardly and upwardly from the cylinder contacting portion of said face and the chamfer in the lower section extending downwardly and inwardly from the cylinder contacting portion of the face of said lower ring and the upper and lower section being in outwardly converging relation with each other.

14. An oil control ring for internal combustion engines comprising superimposed intermediate, upper and lower ring sections, the intermediate section being relatively flat and having a cylindrical face adapted to engage flush with the cylinder wall and each of the upper and lower ring sections having narrow circumferential ribs and a chamfer on its outer face, the circumferential ribs having a beveled edge and forming a cylinder contacting portion, the upper and lower ring sections being of uniform cross section throughout the circumference of the ring and the chamfer on the upper section extending inwardly and upwardly from the cylinder contacting portion of said face and the chamfer in the lower section extending downwardly and inwardly from the cylinder contacting portion of the face of said lower ring and the upper and lower sections being in outwardly converging relation with each other.

15. In an oil ring for internal combustion engines comprising superimposed intermediate upper and lower ring sections, the upper and lower ring sections being of uniform cross section throughout and the outer face of the upper ring section above its cylinder contacting portion being removed or reduced and the outer face of the lower ring section below its cylinder contacting portion being removed or reduced, the upper and lower ring sections being disposed to said removed or reduced portions in outwardly converging relation with the outer lower corner of the upper ring section engaging the upper side of the intermediate section and the upper outer corner of the lower ring section engaging the lower side of the intermediate section and the upper inner corner of the upper section being adapted to engage the upper side of the piston groove and the lower inner corner of the lower section being adapted to engage the lower side of the piston groove, the upper section being moved inwardly by hydraulic pressure of the oil and excess oil being forced to pass between the upper section and the intermediate section during the upstroke of the piston and the lower section being moved inwardly by the hydraulic pressure of oil and the excess oil being forced to pass between the lower section and the intermediate section during the downstroke of the piston.

16. An oil control ring for internal combustion engines comprising superimposed intermediate, upper and lower ring sections, the intermediate section being relatively flat and having a cylindrical face adapted to engage flush with the cylinder wall and each of the upper and lower ring sections having cylinder contacting portions and a chamfer on its outer face, the upper and lower ring sections being of uniform cross section throughout the circumference of the ring and the chamfer on the upper section extending inwardly and upwardly from the cylinder contacting portion of said face and the chamfer in the lower section extending downwardly and inwardly from the cylinder contacting portion of the face of said lower ring and the upper and lower section being in outwardly converging relation with each other, and a spring expander adapted to engage only the intermediate ring sections.

ROY W. PATON.